June 3, 1941.　　　D. I. BOHN　　　2,243,833
TRANSIENTLESS TIMER
Filed April 15, 1939
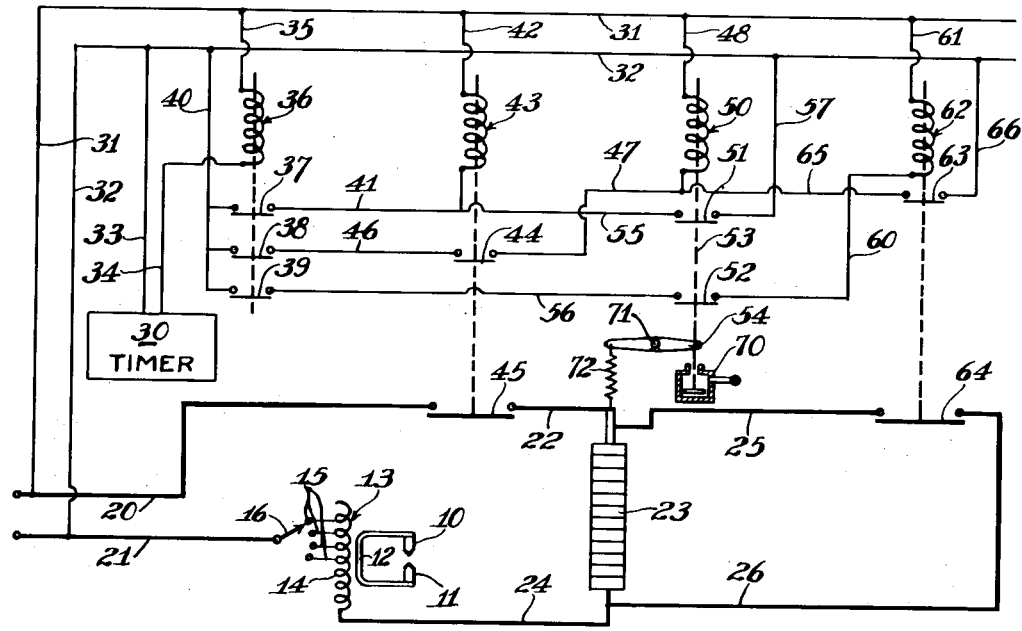
Fig. 1.
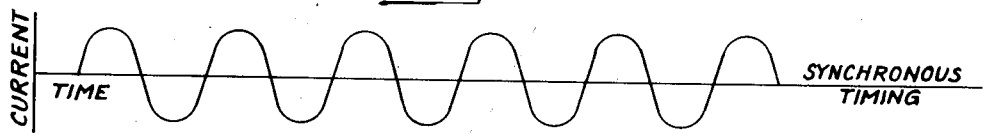
Fig. 2. SYNCHRONOUS TIMING
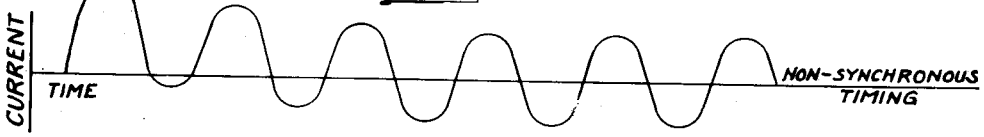
Fig. 3. NON-SYNCHRONOUS TIMING
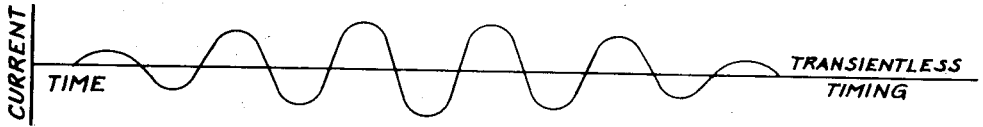
Fig. 4. TRANSIENTLESS TIMING
INVENTOR.
DONALD I. BOHN.
BY S. Ernest Low.
ATTORNEY.

Patented June 3, 1941

2,243,833

UNITED STATES PATENT OFFICE 2,243,833

TRANSIENTLESS TIMER

Donald I. Bohn, Pittsburgh, Pa., assignor to Aluminum Company of America, Pittsburgh, Pa., a corporation of Pennsylvania Application April 15, 1939, Serial No. 268,107

13 Claims. (Cl. 219—4)

This invention relates generally to electric resistance welding, and it relates more particularly to an improved method and system for controlling and modifying the flow of current in electric resistance welding machines, such as spot, seam, and butt welders, and the like.

The invention may be conveniently explained with respect to an electric resistance welding machine of the spot welding type, which employs one of the several forms of conventional control apparatus. In such a machine there are normally two work-engaging electrodes forming integral parts of the secondary or work circuit of an alternating current welding transformer. This secondary circuit is usually comprised of a single turn transformer winding, two current-carrying conductors, two electrode holding arms, and two opposing electrodes. The primary circuit of the welding transformer is normally a multi-turn transformer winding connected directly, or through a multiple tap connection, across a source of alternating current, usually at commercial frequency and potential. The transformer is employed to step up the current capacity of the secondary circuit and to reduce the potential applied to the work to such value as is normally required.

The use of a transformer in a welding system may result in the flow of harmful transient currents through the work at the beginning or end of a welding period. These transient currents are caused by the magnetic characteristics of the transformer, as is well known in the art. It is for the elimination or nullification of such transient currents toward which the present invention is directed, as will hereinafter appear.

The application of welding current to the work-engaging electrodes in the usual welding systems is normally controlled by a suitable switch in the primary circuit of the welding transformer. Such a switch is adapted to control the energization and de-energization of the welding transformer, and, therefore, is employed to control the flow of current in the secondary or work circuit of the welder.

Since the welding period in normal welding practice is relatively small, being measurable in terms of half cycles of current at commercial frequency, numerous automatic current timing means have been devised for opening and closing the primary circuit of the welding system at predetermined short intervals. Such timing devices, commonly referred to as welding timers, have also been designed with a view toward making possible equal apportionment of welding energy to successive welds, so that accurate control and duplication of weld characteristics may be maintained. The various types of welding timers have included manually or mechanically operated and timed switches, circuit opening devices which operate at a predetermined interval after manual or mechanical closing, switches nearly mechanically synchronized with the frequency of the alternating current source, space discharge devices of the electronic type adapted to function as electric valves for permitting fractions of cycles of current to flow, and variable impedance devices controlled by space discharge devices.

In theory, all of the aforementioned timers are adapted to measure out a certain number of cycles or fractions of cycles of alternating current for any particular weld. But in practice with mechanical switches however controlled, it has been found generally impossible to open and close the primary circuit at exactly the same point on the current wave for successive welds. It has been further found almost impossible to continuously open and close the circuit at points where the instantaneous current value is at zero. Therefore, as is well known in the art, arcing or leakage of current across the switching elements of almost all presently known timing devices operates to destroy the precise measurement or apportionment of energy attempted to be made for a particular weld. In summary, it may be said that if a welding circuit be not closed or opened at the desired instant in the current cycle, transient effects would be present in the welding system as a result thereof, such transient effects being characteristics attributable to magnetic properties of the welding transformer, and to arcing or leakage resulting in the building up of unbalanced potentials.

The present invention contemplates the gradual increase of current value upon the closing of the primary or secondary of the welding transformer circuit, and the gradual decrease of current value before the opening of the circuit, as a general method of eliminating or nullifying the effect of transient currents caused by the aforementioned transient characteristics. This invention further contemplates improved weld characteristics resulting from the cushioned application of power to the work and its cushioned removal; and it is pointed out that the metallurgical characteristics of the weld metal may be improved by gradual heating and gradual cooling.

This invention has for a general object, then, to provide a current control and modifying method and system adapted to be employed with resistance welders and welding timers, which will be simple and efficient, which will greatly improve the accuracy of apportionment of welding energy to individual and successive welds, and which will make possible great improvement in the characteristics of the weld metal.

The invention also has for an object the substantial elimination of harmful transient phenomena occurring in a welding system during the application of power and during the removal of power.

Another object of this invention is to nullify the harmful effect caused by arcing or leakage of current across switching contacts.

A further object is to provide a means for controlling and modifying the flow of current to any particular weld so that the weld characteristics will be greatly improved. It is also an object to eliminate any possible arcing or leakage of current at a timer switch, and it is an object to make possible the accurate measurement of welding current for each individual weld in a succession of welds.

A further object is to also provide a method and system for use with a welder and associated timer, whether of the synchronous or non-synchronous type, so that harmful transient phenomena are eliminated. Another object is to make it unnecessary to employ delicate expensive timers to apportion, control and modify welding power.

Other objects will become apparent upon reading of the following description of the preferred method and system.

Reference is now made to the drawing, in which:

Fig. 1 represents, diagrammatically, a resistance welding system incorporating the novel features of the invention;

Fig. 2 is a current-time curve representative of an ideal condition of welding current wherein the timing of the welding current is in synchronism with the frequency of the current source, and wherein the cycles of current are uniform, symmetrical, and balanced;

Fig. 3 is a current-time curve representative of one possible welding condition, wherein the timing of the welding current is not in synchronism with the frequency of the power source, and wherein the cycles of current are non-uniform, non-symmetrical, and unbalanced; and Fig. 4 is a current-time curve representative of a welding condition obtainable by means of the present invention, wherein the timing of the welding current is transientless and balanced, and wherein the successive cycles of current are substantially alike and substantially symmetrical throughout the greater portion of the welding interval.

Before describing the welding system illustrated in Fig. 1, reference is made to the curves of Figs. 2, 3, and 4, and to the general method employing this invention.

The ideal welding current characteristics are represented by the curve of Fig. 2. With the most accurate synchronous-electronic timing, a current wave characteristic, such as is shown in Fig. 2, may be obtained; that is, the successive cycles and welds will be alike. However, because of the high cost of synchronous-electronic timers, and because of the obstacles met with in the forms of other timing equipment having any reasonable range of utility, and for the reasons set forth above, the present invention is particularly adapted for use with timers which apportion a welding current having the characteristics similar to those represented by the curve of Fig. 3. In Fig. 3, the first few cycles of the welding current are unbalanced by transient phenomena. It has been found that normally the first two or three cycles of welding current may have a variation from normal root-mean-square current value as great as 100 per cent. Since it is almost impossible to keep this variation from normal effective current value the same in successive welds, it becomes evident that accurate apportionment of energy to successive welds is a practical impossibility with the presently known mechanically or electrically operated switch types of welding timers alone.

In order to nullify, eliminate, or make ineffective the harmful transient phenomena, it has been found desirable to control and modify the welding current to produce a welding current curve having characteristics similar to those represented by Fig. 4. This curve represents the gradual increase of effective current value from a relatively low value to a normal value in the first few cycles or half cycles of welding current, and it also represents the gradual decrease of current value in the same manner prior to the termination of the welding period. The timing of the period of current application in the method and system adapted to produce the current wave of Fig. 4 may be substantially the same as in present synchronous or non-synchronous timing systems. However, control and modification of the welding current during its application and removal makes it possible to substantially eliminate the harmful transient phenomena, above referred to.

The method of control and modification of the welding current during the period of power flow is now set forth. A welding transformer, upon the closing of the primary circuit, is first energized, not at full welding voltage, but at a greatly reduced voltage. The initial voltage may be sufficiently low so that harmful transient phenomena will be largely eliminated. This substantial elimination of the harmful transient phenomena may be effectuated in a very short period at the beginning of the welding cycle, whereupon the voltage and effective current value is rapidly and preferably substantially steplessly increased to normal welding value without the build-up or inducement of non-symmetrical transient currents.

Upon the substantial completion of the weld, the value of voltage and current is again reduced gradually and preferably substantially steplessly to a negligible value through a similar period, which may be further determined by the metallurgical characteristics desired in the weld. Such reduction in current and voltage may, of course, be made within a few cycles or fractions of cycles where desired, whereupon the timer employed opens the welding circuit without arcing or leakage and without leaving behind successively unequal values of stored energy in the transformer core, which appears as weld energy. Since the initial above-described closing of the primary circuit is made at low voltage, arcing and leakage will be substantally eliminated at that point also.

Thus, it may be seen that it is possible in this method of current control and modification to retain all the advantages and savings in cost of any of the particular forms of welding timers presently known, and yet to substantailly eliminate harmful transient phenomena. It is particularly to be noted that this method of control makes unnecessary the use of highly specialized types of welding timers.

The control and modification aforementioned has been described as applicable in the primary circuit. This language is not to be taken as limiting, since the method is applicable in either the primary or secondary circuit of the welding transformer. Although it is the usual practice to control a welder by means of a switch in the primary circuit, nevertheless, this invention is applicable to the secondary circuit, where desired.

The method described above relates the major steps for most effectively employing the invention. It should be noted, however, that many modifications thereof are possible. For example, the current could be applied at a low voltage in the first instance, followed by stepless increase of voltage and current to normal value, followed by opening of the circuit in the normal manner upon completion of a weld. Or the current could be applied to the work in the conventional manner at normal voltage but removed in stepless increments before opening of the circuit. Either of these variations of the preferred method will also give improved results.

Apparatus for carrying out the general method set forth above may employ an adjustable impedance or resistance of relatively high maximum value in the primary circuit of the welding transformer, and a means for quickly and preferably substantially steplessly adjusting the impedance or resistance to decrease or increase its value, for controlling current and voltage values. The impedance or resistance element could take such forms as a tapped auto-transformer winding, a movable air or iron core reactance, an induction regulator, a multi-tap resistor or other adjustably tapped rheostat, or a properly controlled carbon pile rheostat. In employing any one of the aforementioned elements, the speed of operation and the accuracy of automatic control become important. The preferred system, as shown in Fig. 1, employs a carbon pile rheostat controlled by means of a series of interlocking contactor switches.

The present invention is adapted for use in association with any of the above mentioned welding timers and others; and has utility on any of the above mentioned resistance welding machines, and others. While hereinafter the description will be confined to a preferred type of timer for use on a particular type of welding machine in conjunction with the current control and modifying system of the present invention, it should be understood that such selections have been made for purposes of exposition only.

Reference is now made to Fig. 1 of the drawing, in which are shown a pair of welding electrodes 10 and 11 forming portions of the secondary or welding circuit 12 of a suitable welding transformer, identified generally by reference numeral 13. The primary circuit of the welding transformer 13 comprises a multi-turn primary winding 14 having a plurality of selective taps 15, to any one of which the transformer tapping arm 16 may be connected. The aforementioned parts schematically represent the elements of a resistance welding machine, and are described for purposes of example only.

The transformer 13 may be supplied with alternating current from a suitable source of electric power, preferably a source of 60 cycle, 110 volt, alternating current. Conductors 20 and 21 from a power source (not shown) represent power mains for supplying welding power to transformer 13, and control power to the associated control devices, to be hereinafter described. Conductor 21 connects directly to transformer tapping arm 16 on transformer 13; and conductor 20 connects to one control post for heavy current contacting member 45 associated with a magnetic switch 43. The second control post for contacting member 45 is connected by a conductor 22 to one side of a carbon pile rheostat 23 of conventional form. The opposite terminal of carbon pile rheostat 23 is connected with the second terminal of the primary winding 14 of the transformer 13 through a conductor 24. For shunting primary current to transformer 13 directly around carbon pile rheostat 23, conductors 25 and 26 are provided, which connect at opposite ends of carbon pile rheostat 23 with conductors 22 and 24, respectively, and which make connection to control posts for a heavy current contacting member 64 associated with a magnetic switch 62.

Timing of the period of application of welding current to transformer 13 is effectuated by a conventional welding timer 30, such as a synchronous-electronic timer, represented diagrammatically by a control box, the wiring not being shown. This timer 30 operates indirectly to open and close the heavy current contacting member 45 in the primary of the welding transformer at the beginning and end of a welding period. The timer 30 is adapted to be pre-set for any particular period of application of welding current, usually determinable in fractions of cycles or half cycles of welding current. Associated with timer 30, contacting members 45 and 64, and carbon pile rheostat 23 are controlling means for the purpose of modifying the welding current, which are now described more fully.

Control conductors 31 and 32 connect to the power source aforementioned through connections with conductors 20 and 21, respectively. Connected across control conductors 31 and 32 and through timer 30, by means of lead wires 33, 34, and 35, is the operating coil of a suitable magnetic switch 36. This switch is provided with three sets of normally open control contacting members 37, 38, and 39. One contact post for each of the contacting members 37, 38, and 39 is connected directly to control conductor 32 by means of lead wire 40.

Connected across the second contact post for contacting member 37 and control conductor 31, by means of lead wires 41 and 42, is the operating coil of a second magnetic switch 43, aforementioned. This switch is provided with one normally open control contacting member 44, and one normally open heavy current contacting member 45 adapted to close the primary circuit by connecting conductors 20 and 22 as aforedescribed. Lead wire 46 connects the second contact post for contacting member 38 on magnetic switch 36 with one contact post for contacting member 44 on magnetic switch 43.

Connected across the second contact post for contacting member 44 and control conductor 31, through lead wires 47 and 48, is an operating coil of a combined solenoid, switch and plunger, referred to generally as solenoid 50. Solenoid 50 is provided with two sets of normally open control contacting members 51 and 52; and the plunger 53 of solenoid 50 is directly connected to a lever 54 adapted to actuate carbon pile rheostat 23. Lead wire 55 forms part of a second energizing circuit for the coil of magnetic switch 43 by connecting one terminal of the coil of magnetic switch 43 to a control post for contacting member 51 on solenoid 50. Lead wire 56 connects the second control post for contacting member 39 of magnetic switch 36, and one control post of contacting member 52 on solenoid 50. Lead wire 57 connects the second control post for contacting member 51 on solenoid 50 to the control conductor 32.

Connected across the second control post for contacting member 52 and control conductor 31, by means of lead wires 60 and 61, is the operating coil of a third magnetic switch 62. This switch is provided with one normally open control contacting member 63 and one normally open heavy current contacting member 64, adapted to close the primary shunt circuit comprised of conductors 25 and 26, previously mentioned. Lead wire 65 forms part of a second energizing circuit for the coil of solenoid 50 by connecting one terminal of the coil of solenoid 50 to one control post for contacting member 63 on magnetic switch 62. Lead wire 66 connects the second control post for contacting member 63 to the control conductor 32.

The control contacting members of each of the aforementioned magnetic switches 36, 43, and 62 are coil and plunger operated by the action of coils on magnetic plungers connected mechanically to the various contacting members in each particular magnetic switch. These magnetic switches are of conventional design and their operation needs no further description. The combined solenoid, switch, and plunger 50 has been distinguished from the magnetic switches 36, 43, and 62 in this description, since its plunger not only serves to actuate the contacting members 51 and 52 associated with each set of contacting posts, but also serves to actuate the carbon pile rheostat 23. It is noted that it may be possible on any of the magnetic switches or on the solenoid unit to adjust the positions or contact lengths of the various contact posts, as desirable.

The plunger 53 of the combined solenoid unit 50 has associated therewith a suitable time-delay device, represented as a dashpot 70, effective to establish a time lag between the energization or de-energization of the solenoid coil and the closing or opening of the control contacting member, and, further, for governing the rate of compression and decompression of the carbon pile 23. Plunger 53 is effective to actuate the carbon pile 23 by movement of lever 54, fulcrumed as at 71. The opposite end of lever 54 is connected to a spring 72 mounted between the end of the lever 54 and the carbon pile 23. Thus, it may be seen that the plunger 53 may be adapted on its downward stroke to relieve pressure on carbon pile 23 while, at the same time, opening contacting members 51 and 52; and also it may be seen that plunger 53 acts on its upward stroke to compress carbon pile 23, thereby drawing the plunger end of lever 54 upward and compressing spring 72 bearing on the carbon pile 23. During the compression stage of the cycle, the contacting members are closed or are being closed, the time-delay device 70 controlling the rate of movement of plunger 53.

The operation of the above described system may now be more fully explained and its objects and advantages more fully set forth.

In utilizing the aforedescribed apparatus and system, the work pieces to be welded are inserted between the electrodes 10 and 11. The electrodes are brought to bear with a predetermined pressure upon the work pieces in the usual manner by manual or automatic means. Conjunctive with the closing of the electrodes, or by separate operation, as is desirable in any particular apparatus, the timer 30 is energized by manual or automatic means. The timer will have been pre-set to close a control switch for a predetermined length of time or to permit a predetermined number of fractions of cycles or half cycles of electric current to flow, whereupon the control switch will be opened again or the current otherwise cut off. Energization of the timer, as aforesaid, closes the circuit to the coil of magnetic switch 36 to actuate the second magnetic switch 43 so that the heavy current contact member 45 will close across the heavy current contacts.

The closing of the control circuit in timer 30, energizes the coil of magnetic switch 36, and closes all three control contacting members 37, 38, and 39. Immediately upon the closing of the contact member 37, the operating coil for magnetic switch 43 is energized.

Upon the energization of the coil of magnetic switch 43, the heavy contacting member 45 closes the primary circuit to the welding transformer 13 through the carbon pile 23, which is in its decompressed condition, affording relatively high resistance to current flow. At the same time, the control contacting member 44 is closed, energizing the coil of combined solenod unit 50.

Immediately upon the energization of the coil of solenoid 50, the plunger 53 is moved at a rate determined by dash pot 70 to begin compression of carbon pile 23 through lever 54 and spring 72. During this condition of the system, the very low initial voltage applied to the welder is gradually, substantially steplessly and quickly brought up to welding value, the rate of change being adjustable by means of a suitable valve or other device associated with the dash pot 70. When carbon pile 23 has been compressed to its limit, nearly full voltage has been applied to transformer 13. The final closing motion of plunger 53 closes control contacting members 51 and 52.

Upon the closing of contacting member 52, the coil of magnetic switch 62 is energized, the closing of control contacts 51 as yet having no effect upon the system.

Energization of the coil of magnetic switch 62 immediately closes its lower current contacting member 64 upon the heavy current contacts in the shunt circuit comprised of conductors 25 and 26. Thus, the carbon pile 23 is short circuited and normal heavy welding current is permitted to flow directly to the primary winding of transformer 13. Also, upon the energization of the coil of magnetic switch 62, its control contacting member 63 is closed simultaneously with contacting member 64, but this closing of contacting member 63 has as yet no effect upon the system.

Throughout the short period of time measured in fractions of cycles of alternating current of commercial frequency, during which the magnetic switches 36, 43, and 62 and the solenoid 50 have been energized, the timer 30 has remained closed and will remain closed throughout the period during which the weld is to take place. After a definite predetermined time interval, determined by the adjustment of the aforesaid timer, the control circuit of timer 30 is opened, incidentally de-energizing the coil of magnetic switch 36. The control contacting members 37 and 38, upon being thus opened, have no effect upon the system as yet, since the magnetic switch 43 and the solenoid 50 are still energized by other circuits. The simultaneous opening of contacting member 39, however, de-energizes the coil of magnetic switch 62.

The de-energization of the coil of magnetic switch 62 opens the heavy current contact member 64 in the shunt circuit comprised of conductors 25 and 26, immediately causing the primary welding current to revert in its flow through the carbon pile 23 and to begin a reduction in voltage caused by the de-energization of the coil of solenoid 50 upon the simultaneous opening of control contacts 63.

Upon the de-energization of the coil of solenoid 50, pressure is removed from carbon pile 23 at a rate determined by the setting of dash pot 70, changing the resistance of carbon pile 23 from a very low value to a very high value quickly but in gradual, substantially stepless increments. The increase in resistance of carbon pile 23 causes a gradual decrease in the voltage applied to the primary winding 14 of transformer 13 down to a relatively small value before the contacting members 51 and 52 become fully open.

The opening of contacting member 52 upon de-energization of the coil of solenoid 50 and the movement of plunger 53, as controlled by dash pot 70, has no further effect upon the system. The simultaneous opening of contacting member 51, however, immediately completes the disconnection of the coil of magnetic switch 43 from either of its energizing circuits.

Upon the de-energization of the coil of magnetic switch 43, the contacting member 44 is opened without further effect upon the system, and the heavy current contact member 45 in the primary circuit of the welding transformer is opened, thus completely de-energizing transformer 13 and completing the welding period.

It will be seen from the above description that stepless application of power to the welding transformer, and also stepless removal of power, has been provided for. Both the application and the removal of power from low voltage to high voltage, and from high voltage to low voltage may be quickly and evenly brought about, and yet the welding period at full voltage not appreciably shortened. With respect to the use of a carbon pile rheostat as the adjustable impedance or resistance element, it may be noted that there is the special advantage that the energy dissipated in heat in the carbon pile will be the same for any setting of the timer 30, since it is inserted only for the periods at the beginning and end of the welding interval determined by the time lag between actuation of timer 30 and opening and closing of the contact member 64 in the shunt circuit comprised of conductors 25 and 26. Therefore, a carbon pile having a continuous rating of a fraction of its maximum instantaneous rating would be adequate for the intermittent use to which it would be put.

The method involved in this novel invention has been set forth in the above description, and a preferred system for its use with respect to a resistance welder has been described. Neither the preferred method nor the preferred system should be taken as limiting in any way the scope of the invention, as it may be employed in many forms. Since this invention is applicable to the many forms of resistance welding machines and timers used therewith, and since its use has heretofore been undiscovered by others, the invention should be confined only within the broad scope of the appended claims.

What is claimed is:

1. A method of resistance welding with alternating current in which harmful transients are substantially eliminated comprising timing a multi-cycle interval in which power is applied to the work, initially energizing the work circuit at a voltage substantially reduced from normal value, gradually and quickly raising the voltage to normal value, and maintaining the voltage at normal value throughout the greater portion of the power interval.

2. A method of resistance welding with alternating current in which harmful transients are substantially eliminated comprising timing a multi-cycle interval in which power is applied to the work, energizing the work circuit at substantially normal welding voltage, maintaining the voltage at substantially normal value throughout the greater portion of the power interval, near the end of the timed power interval gradually and quickly reducing the voltage, and finally disconnecting the power from the work at the reduced voltage.

3. A method of resistance welding with alternating current in which harmful transients are substantially eliminated comprising timing a discrete multi-cycle interval in which power is applied to the work, initially connecting power to the work at a voltage substantially reduced from normal value, gradually and quickly raising the voltage to normal value, maintaining the voltage at normal value throughout the greater portion of the power interval, near the end of the timed interval gradually and quickly reducing the voltage, and finally disconnecting the power from the work at the reduced voltage.

4. A method of electrical resistance welding with alternating current whereby harmful transient phenomena are eliminated comprising timing multi-cycle intervals in which power is applied to a welding system in predetermined "on" periods, during an "on" period initially energizing the work circuit at a voltage substantially reduced from normal welding value, gradually, quickly and in substantially stepless increments increasing the voltage to normal welding value, maintaining the voltage at normal welding value throughout the greater portion of the "on" period, near the end of the "on" period gradually, quickly and in substantially stepless increments decreasing the voltage to a value substantially reduced from normal welding value, and finally de-energizing the work circuit while the voltage is at the reduced value to effectuate an "off" period.

5. In a method of resistance welding with alternating current, wherein substantial elimination of undesirable transients during a multi-cycle welding interval is effected, the steps comprising initially connecting the work to the source of power at a voltage substantially below normal welding value, increasing the voltage to its normal value and maintaining that voltage value for a greater portion of the welding interval, and thereafter reducing the voltage to terminate the welding interval.

6. In a system for resistance welding, a primary circuit adapted to be connected to a source of alternating current, a secondary circuit for conducting welding current to the work, timing means adapted for closing said primary circuit for a predetermined interval, and means in said primary circuit actuated by said timing means for adjusting the voltage applied therethrough during a timed welding interval.

7. In an apparatus for resistance welding a transformer, a secondary circuit for said transformer adapted to include the work to be welded, a primary circuit for said transformer adapted to be connected to a source of alternating current, a welding timer, an adjustable impedance in said primary circuit, means actuated by said timer for decreasing the value of said impedance at the beginning of a welding interval, and means actuated by said timer for increasing the value of said impedance at the end of a timed welding interval.

8. In an apparatus for resistance welding a transformer, a secondary circuit for said transformer adapted to include the work to be welded, a primary circuit for said transformer adapted to be connected to a source of alternating current, a welding timer, an adjustable impedance in said primary circuit, means actuated by said timer for decreasing the value of said impedance and closing a circuit shunting said impedance at the beginning of a welding interval, means actuated by said timer for opening said shunting circuit and increasing the value of said impedance at the end of a timed welding interval, and time-delay means associated with said means for decreasing and increasing the value of said impedance adapted to control the rate of change thereof.

9. In an electric resistance welding system a welding circuit, a welding transformer, a transformer energizing circuit the impedance of which is adjustable, a welding timer adapted to open and close the energizing circuit for said transformer, means operable by said timer upon the closing of said energizing circuit for rapidly decreasing the impedance of said energizing circuit, and means operable by said timer for rapidly increasing the impedance of said energizing circuit before the opening thereof by said timer.

10. An electrical resistance welding system comprising a work circuit, a welding transformer, a source of alternating current, timing means for connecting said current source to said transformer for a predetermined interval, an adjustable impedance in said welding system, means for adjusting the value of said impedance electrically connected with and actuated by said timing means, whereby the adjustable impedance is subjected to rapid substantially stepless change in value during the welding interval.

11. In an electrical resistance welding system a welding transformer, a work circuit including the secondary winding of said welding transformer and work-engaging electrodes, a primary circuit adapted to be connected to a power source for energizing said transformer, timing means for connecting said primary circuit to a power source for predetermined timed intervals, an adjustable impedance in said welding system, means electrically connected with and actuated by said timing means for adjusting the value of said impedance at the beginning and end of a timed power interval, and time-delay means operable to govern said impedance adjusting means.

12. In an electrical resistance welding system a welding transformer, a work circuit including the secondary winding of said welding transformer and a pair of work-engaging electrodes, a primary circuit adapted to be connected to a power source for energizing said transformer, timing means for connecting said primary circuit to a power source for predetermined timed intervals, an adjustable impedance adapted to be inserted in said primary circuit, means actuated by said timing means for connecting said transformer to a power source through said adjustable impedance, means actuated by said timing means for decreasing the value of said adjustable impedance at a predetermined rate at the beginning of the interval timed by said timing means, means actuated by said timing means for shunting the primary current around said adjustable impedance, said means also actuated by said timing means for restoring the primary current flow through said impedance, and means actuated by said timing means for increasing the value of said adjustable impedance at a predetermined rate at the end of the interval timed by said timing means.

13. In an electrical resistance welding system, a primary circuit adapted to be connected across a source of power, a secondary circuit adapted to be connected across the work, a welding timer, and means electrically connected with and actuated by said timer during the welding interval controlled thereby for adjusting the potential of the welding power in the system.

DONALD I. BOHN.